United States Patent [19]
Shimoi et al.

[11] Patent Number: 5,995,569
[45] Date of Patent: Nov. 30, 1999

[54] METHOD FOR ESTABLISHING SYNCHRONIZATION AND DEMODULATOR USING THE SAME

[75] Inventors: Tetsushi Shimoi; Taichi Karaki, both of Mitaka, Japan

[73] Assignee: Japan Radio Co., Ltd., Tokyo, Japan

[21] Appl. No.: 08/871,762

[22] Filed: Jun. 9, 1997

[30] Foreign Application Priority Data

Jun. 18, 1996 [JP] Japan ................................. 8-156589

[51] Int. Cl.$^6$ ........................................................ H04L 7/00
[52] U.S. Cl. .................... 375/354; 325/356; 325/344; 325/329; 325/232
[58] Field of Search .................................. 375/354, 356, 375/344, 368, 267, 355, 341, 371, 329, 232; 370/324, 350; 348/521

[56] References Cited

U.S. PATENT DOCUMENTS

| | | | |
|---|---|---|---|
| 4,466,108 | 8/1984 | Rhodes | 375/329 |
| 5,148,276 | 9/1992 | Furumiya et al. | 348/521 |
| 5,463,627 | 10/1995 | Matsuoka et al. | 370/350 |
| 5,475,710 | 12/1995 | Ishizu et al. | 375/232 |

*Primary Examiner*—Stephen Chin
*Assistant Examiner*—Shuwang Liu
*Attorney, Agent, or Firm*—Oliff, & Berridge, PLC

[57] ABSTRACT

A method for establishing synchronization and a data demodulator using the same. Clock and frame synchronization is established by a UW detector. Then, a Δω detector and a ΔΦ detector detect a frequency error and a phase error, respectively, from a unique word (UW) latched and held in memory so that frequency and phase synchronization is established in phase rotation by a complex rotator. That is, clock, fame, frequency, and phase synchronization are all established using a UW in the initial frame alone. This allows a receiver to establish the above synchronization at a high speed. Further, as a delay unit compensates a delay occurred in the processing by the Δω detector and the Δω detector, data loss is prevented.

4 Claims, 15 Drawing Sheets

METHOD FOR ESTABLISHING SYNCHRONIZATION AND DEMODULATOR USING THE SAME

BACKGROUND OF THE INVENTION

The present invention relates to a method for establishing synchronization with respect to a receiving signal, and further to a data demodulator using the same.

DESCRIPTION OF THE RELATED ART

FIG. 9 shows an example of a frame transmission procedure. At the start of transmission, a transmitter sets a constant value and a known bit trading pattern (BTR) onto a respective continuous wave data (CW) section 100 and a bit trading pattern (BTR) section 102, respectively and then outputs these sections to a receiver. The data contained in these sections are referred to as preambles, as they are transmitted prior to a main frame. After preambles are transmitted, a desired or predetermined number of frames are transmitted sequentially as frame (a), frame (b), and so forth. The body of each frame comprises a unique word (UW) section 104 and a data section 106. A transmitter sets predetermined, unique word (UW) and data to be transmitted to a receiver onto a UW section 104 and a data section 106, respectively, and transmits these sections to the receiver in this sequence. As described above, redundant bit sequences which are not meaningful in themselves, such as a CW section 100, a BTR section 102, and a UW section 104, are used in data transmission, besides a data section 106, which is directly used in the transmission. These sections are transmitted to be used in establishing synchronization between a transmitter and a receiver.

In frame transmission, a receiver must establish four types of synchronization, namely: frequency synchronization, phase synchronization, clock synchronization, and frame synchronization. To establish frequency synchronization means to compensate a frequency error $\Delta\omega$ contained in a receiving signal; to establish phase synchronization means to compensate a phase error $\Delta\Phi$ contained in a receiving signal; to establish clock synchronization means to synchronize a receiver clock to a clock used by a transmitter in frame preparation; and to establish frame synchronization means to detect the position of a frame, in particular, of a data section 106 in a frame for achieving demodulation of data stored in a data section 106. A frequency error $\Delta\omega$ is caused due to errors in a frequency of a local or reference oscillator within a transmitter or a receiver, or due to frequency shifts occurred in transmission channels. A phase error $\Delta\Phi$, on the other hand, is caused due to phase shifts occurring in transmission channels, and also occurs when a receiver cannot determine a phase reference used by a transmitter, which is particularly the case when using a modulation system in which a transmitter modulates a carrier by giving a phase shift corresponding to the data to be transmitted. For principle reasons, a receiver side generally cannot know in advance information regarding frequency errors $\Delta\omega$, phase errors $\Delta\Phi$, clock and frame output timing on a transmitter side, and so on. Even if when the receiver does have this information in advance, it accompanies difficulties. Due to this, a receiver in data transmission using frames is required to have a function for establishing synchronization of the above four types based on a receiving signal at an early stage of the transmission. Given this function, data in a data section 106 can be demodulated on the receiver side at such an early stage as possible after transmission began.

The circuit shown in FIG. 10 has a function for establishing frequency synchronization and phase synchronization using a CW section 100, clock synchronization using a BTR section 102, and frame synchronization using an UW section 104. In the drawing, "a receiving signal" means a receiving signal for which synchronization of the above four types is not yet established (hereinafter referred to as a not-synchronized receiving signal). "Demodulated data" means data which has been demodulated from a data section 106.

Having received a not-synchronized signal, a $\Delta\omega$ detector 10 detects a frequency error $\Delta\omega$ in the signal and then supplies the result into a complex rotator 12. If a frequency error $\Delta\omega$ is actually occurring, the value of the receiving signal (rin+jiin) rotates on a complex phase space at angular speed equal to the frequency speed $\Delta\omega$. It should be noted that the angular speed becomes $\Delta\omega$ only when the value of a signal output from a transmitter (hereinafter referred to as a transmitting signal) remains constant, for instance when a CW section 100 is supplied to a $\Delta\omega$ detector 14. Therefore, observation of a speed in which a transmitting signal rotates on a complex phase space, for instance in a CW section 100 by the $\Delta\omega$ detector 10, will correctly identify the extent of a frequency error $\Delta\omega$ (see FIG. 11). In FIG. 11, rini+jiini refers to the value of a receiving signal at time ti (i=1, 2, 3 . . . ). Referring to a frequency error $\Delta\omega$ detected by $\Delta\omega$ detector 10, complex rotator 12 rotates the phase of the receiving signal by an extent $e^{-j\Delta\omega t}$, wherein j is an imaginary unit and t is time. Then, the influence of the frequency error $\Delta\omega$ on the receiving signal, which appears in the form of phase rotation by an extent $e^{j\Delta\omega t}$ on complex phase space, is corrected, and frequency synchronization is thus established.

Having received a signal from complex rotator 12, a $\Delta\Phi$ detector 14 detects a phase error $\Delta\Phi$ in the receiving signal. If a phase error $\Delta\Phi$ is now actually occurring, the value of the receiving signal (rin+jiin) is located at a position shifted by an extent $e^{j\Delta\Phi}$ with respect to the value of a transmitting signal. As mentioned above, since the phase rotation $e^{j\Delta\omega t}$ due to the frequency error $\Delta\omega$ has already been compensated from the receiving signal by the complex rotator 12, as the phase shift, $e^{j\Delta\Phi}$ due to the phase error $\Delta\Phi$ appears solely in the receiving signal. In the period in which the transmitting signal value is known to the receiver, a phase error $\Delta\Phi$ can be detected from the difference between the receiving signal value $e^{j\Delta\omega t}$. (rin+jiin) and a known value (rref+jiref) of the transmitting signal (see FIG. 12). The $\Delta\Phi$ detector 14 detects the phase error $\Delta\Phi$ based on this principle. In this detection, the $\Delta\Phi$ detector uses the CW section 100 in which the transmitting signal value is set constant, to avoid errors due to the variation of transmitting signal values. After a phase error $\Delta\Phi$ was detected, complex rotator 16 shifts the phase of a receiving signal whose frequency has been synchronized by $e^{-j\Delta\Phi}$, referring to the phase error $\Delta\Phi$ detected. This eliminates the influence of a phase error $\Delta\Phi$ on the receiving signal, the error $\Delta\Phi$ appearing in the form of a phase shift by an extent $e^{j\Delta\Phi}$ on a complex phase space. With this, phase synchronization is established.

Following the establishment of frequency and phase synchronization using a CW section 100, a BTR detector 18 samples a signal relative to a BTR section 104 from a signal output by complex rotator $\Delta\Phi$. It then detects the correlation between known BTR and decides the timing of the largest correlation as the write timing of the receiving signal to a memory 20. With this, clock synchronization is established. Since the BTR set by the transmitter has a bit pattern in which the bit value varies alternately between two values, the receiving signal point in the complex phase space moves periodically and alternately between two points. For instance, in the case that the BTR is designed as the pattern in which the bit value alternately varies between −1+j1 and +1+j1, the received BTR section 102 will show the pattern in FIG. 13. Thus, in order to obtain the most likelihood clock timing for writing data into a memory 20, the value $e^{-j(\Delta\omega i+\Delta\Phi)}$. (rin+jiin) of a receiving signal whose frequency and phases have been synchronized is sampled at an over-sampling rate which is sufficiently faster than a symbol rate, and the correlation between the sampled value and the value of a known and predetermined BTR is determined to know the timing of the largest correlation. By starting to write the receiving signal in the memory 20 according to the clock timing detected, clock synchronization is established. Note that in FIG. 13 the frequency and phase errors are neglected to simplify the figure.

After frequency, phase, and clock synchronization have been established as above, UW detector 22 observes the correlation between known UW and the UW section 104 in the receiving signal held in memory 20. By detecting the timing of the largest correlation, the UW detector 22 detects a frame position. To be specific, since the value of UW data varies in a predetermined pattern as mentioned above, a frame position (i.e., the end position of a UW section 104, or a start position of a data section 106 in this application) can be detected as the timing of the largest correlation between a known UW and the UW section 104 in the receiving signal stored in memory 20. With a frame position detected, a de-framing section 24 can extract a data section 106 from the receiving signal stored in memory 20. After frame synchronization is established by detecting the frame position as above, de-framing section 24 can output preferable demodulated data, that is, demodulated data without significant errors. Once frequency, phase, clock, and frame synchronization have been established, data demodulation can be continued using a conventional UW detection and de-framing technique (see FIG. 14). Further, it is also possible to terminate the operations of Δω detector 10, ΔΦ detector 14, BTR detector 18, and so on.

The above procedure shown in FIGS. 10 to 14, however, has the problems detailed below. In this procedure, a CW section 10, a BTR section 102, and a UW section are necessary. Therefore, if preambles are missed for some reason as shown in FIG. 15, the above synchronization cannot be establishing as they are all indispensable for synchronization establishment. In FIG. 15, numbers added to respective sectional numbers, such as (a), (b), (c) . . . , correspond to the numbers of frames to which respective sections belong. In the following, a synchronization establishing procedure which is free from this problem will be described with reference to FIGS. 16 to 20. This procedure, does not require preambles. First frequency synchronization is established, followed by frame and clock synchronization, finally leaving phase synchronization to be established. Note that members having the same function as those in the prior art are hereinafter given the same reference numerals.

In this procedure, when receiving the main frame, Δω detector 26 shown in FIG. 16 first multiplies the frequency of a receiving signal by a frequency multiplication ratio n which is determined such that the value (rini+jiini) of the receiving signal at time ti (i=1,2,3, . . . ) is always converted to a constant value (rinM+jiinM) i.e. continuous wave through the frequency multiplication, as shown in FIG. 17. The Δω detector 26 then performs the same processing as that performed by the Δω detector 10 in FIG. 10, to detect the frequency error the receiving signal after the frequency multiplication. Since at this stage the receiving signal has already converted to the equivalent value to the continuous wave through frequency multiplication, the Δω detector 26 can accurately detect the frequency error. However, due to frequency multiplication, the frequency error detected by the Δω detector 26 becomes n·Δω. The Δω detector 26 finally multiplies the detected frequency error by 1/n, to obtain the frequency error Δω of the actual receiving signal. Thus, the actual frequency error Δω can be obtained in FIG. 16, even when a CW section 100 is unavailable and regardless of the variation of receiving signal value in the main frame.

Following the above process, UW detector 28 then detects a timing when the correlation between the UW is the largest, and begins to write the receiving signal into memory 20 according to the detected timing. Clock synchronization and frame synchronization are established at the same time (see FIG. 18). Note that correlation detection by UW section 28 must be carried out using a method which either does not cause or can offset the influence of a phase error ΔΦ.

A ΔΦ detector 30 shown in FIG. 16 detects a phase error ΔΦ from a receiving signal held in memory 20. In a phase modulation system, a modulated signal forms a constellation pattern corresponding to a used modulation system on a complex phase space with the inclination by an extent of a phase error ΔΦ, if such a phase error ΔΦ occurs (see FIG. 19). Therefore, detecting this inclination identifies the extent of a phase error ΔΦ. In other words, a phase error ΔΦ can be detected from a modulated signal held in memory 20, instead of a continuous wave, when using a UW section 104 which is supplied to ΔΦ detector 30 after frame synchronization has been established.

However, the method above shown in FIGS. 16 to 20 also has a problem in that a plurality of frames are used in establishing synchronization, and thus data transmission is impossible during a period of time when those frames are transmitted, that is, from the start of data transmission to the establishment of synchronization, mainly due to the following reasons.

First, frequency error detection generally requires a period of time equivalent to that in which one or two frames are transmitted, though it varies for respective systems. In more detail, provided that the process for synchronization establishment is started from the moment when the frame (a) is input, a signal is first subjected to n-time multiplication in the method shown in FIGS. 16 to 20 to prepare a continuous wave to be used in a frequency error Δω detection. This n-time multiplication, however, not only multiplies a receiving signal frequency, but also multiplies noise components generally contained in the receiving signal. Multiplied noise components will cause deterioration of the accuracy of frequency error detection. To suppress this deterioration and to maintain at least equal accuracy to that in the art shown in FIGS. 10 to 14, a sufficient amount of information must be gathered for frequency error detection by prolonging a period or time spent therefor so that compensation can be made for the influence of noise components. For this, data having at least the same length as that of a whole frame (a), that is, the total length of a UW section 104 (a) and a data section 106 (a), will generally be required.

Second, for stability, it is desirable to execute phase error ΔΦ detection concurrently with the receipt of an UW section 104. This, however, causes a delay in establishment of relevant synchronization. Specifically, after clock and frame synchronization is established using a UW section 104 (b) in the frame (b), phase synchronization is established using a UW section in the next frame, that is, UW section 104 (c) in the frame (c) in FIG. 15. As a result, data preceding a data section 106 (b) in the frame (b) will be missed.

SUMMARY OF THE INVENTION

A first object of the present invention is to establish various types of synchronicities in a short time, i.e., using only a UW section in the initial receiving frame, without causing any missed data, even in a case that a preamble of a receiving frame is for some reason missed or for a design reason is not originally provided. A second object of the present invention is to provide a data demodulator of a high speed synchronization type which is capable of performing data transmission using a frame consisting of an only UW section and a data section. These objects can be achieved using a synchronization establishment method comprising the following steps or a data demodulator using this method.

In this invention, when receiving data using a frame, a first step is executed to a not-synchronized receiving signal. In this first step, a clock timing used in frame preparation by a transmitter side and the position of data contained in the frame are detected from a not-synchronized receiving signal. The not-synchronized receiving signal is then sampled and stored according to the timing and position detected, so that clock and frame synchronization with respect to the transmitter side is established on the receiver side. The receiving signal according to the initially detected clock timing and data section position can be utilized to concurrently establish frequency synchronization and phase synchronization, in other words, without waiting for the arrival of the next frame, as will be described later. This allows reduction of a period of time necessary to establish all required synchronization.

In a subsequent second step, a frequency error $\Delta\omega$ is detected from the receiving signal stored in the first step. A frequency error $\Delta\omega$ may be caused due to a frequency shift occurring in a transmission channel, or an error of an oscillation frequency in a transmitter and/or a receiver.

In a third step, compensation for a frequency error $\Delta\omega$ appearing on the receiving signal stored in the first step is made based on the frequency error $\Delta\omega$ detected in the second step, so that a phase error $\Delta\Phi$ due to a phase shift in a transmission channel or other reasons is determined from the receiving signal with the frequency error corrected.

In a fourth step, the not-synchronized receiving signal is supplied to a subsequent stage in a delay corresponding to the period of time necessary to complete the second and third steps so that a process delay-corrected receiving signal is generated.

In a fifth step, a frequency error $\Delta\omega$ and a phase error $\Delta\Phi$ appearing on the process delay-corrected receiving signal are compensated for based on the frequency error $\Delta\omega$ and the phase error $\Delta\Phi$ detected in the second and third steps. With the above processing, frequency synchronization and phase synchronization with respect to a transmitter side are established on a receiver side. If the fourth step is not executed, that is, a not-synchronized receiving signal is supplied to the fifth step without giving a delay thereto in the fourth step, data on the frequency error $\Delta\omega$ and the phase error $\Delta\Phi$ are resultantly supplied to the fifth step in a delay with respect to the timing of supplying a not-synchronized receiving signal to the fifth step since the second and third steps need some time to be completed (i.e., causing a delay in the processing). As a result, a frequency error $\Delta\omega$ and a phase error $\Delta\Phi$ correct compensation cannot be made during a period of time corresponding to this delay, and this results in missing of demodulated data. In other words, the fourth step can prevent the occurrence of missing data, achieving high-quality data transmission with improved real time performance, even when using a frame without a preamble.

Note that, in putting the present invention into practice, first and second reference data are preferably prepared prior to the execution of the first to third steps. First and second reference data have the same length as that of a UW contained in a frame used in transmission. Also, first reference data is identical to the UW, and the second reference data is a complex conjugate thereof. With those data prepared beforehand, the following are achievable:

(a) clock synchronization and frame synchronization are established by detecting the timing when the correlation between a non-synchronized receiving signal and the first reference data become the largest;

(b) a frequency error $\Delta\omega$ is detected at a second step by detecting a phase rotation speed, based on a multiplied result of a receiving signal stored in the first step and the second reference data; and (c) a phase error $\Delta\Phi$ is detected at a third step in phase comparison between a receiving signal with a frequency error $\Delta\omega$ corrected and the first reference data.

In other words, when using a receiving signal for which frame and clock synchronization have already been established, frequency and phase synchronization can be established in the processing adaptable for high speed performance such as correlation detection or phase comparison between a receiving signal and reference data or multiplication of the receiving data by reference data. This also is effective in reducing the time required to establish all the required synchronization. In addition, since frame, clock, and phase synchronization are all established using the first reference data, the amount of necessary reference data and data storage capacity can be reduced.

In executing the present invention, a not-synchronized receiving signal is preferably subjected to delay detection prior to the execution of the first step to cancel a frequency shift therein. This ensures accurate and stable detection of a clock timing and the position of a data section in a frame from the receiving signal which is transmitted via a channel even causing, for instance, a significant frequency shift.

Furthermore, the present invention is advantageously adaptable for a system in which a transmission format has originally been designed to include no preamble, in addition to the application to accidental missing of preambles.

BRIEF DESCRIPTION OF THE DRAWINGS

The above and the other objects, features, and advantages, will become further apparent from the following description of the preferred embodiment taken in conjunction with the accompanying drawings wherein.

DESCRIPTION OF THE PREFERRED EMBODIMENTS

Figure 1:
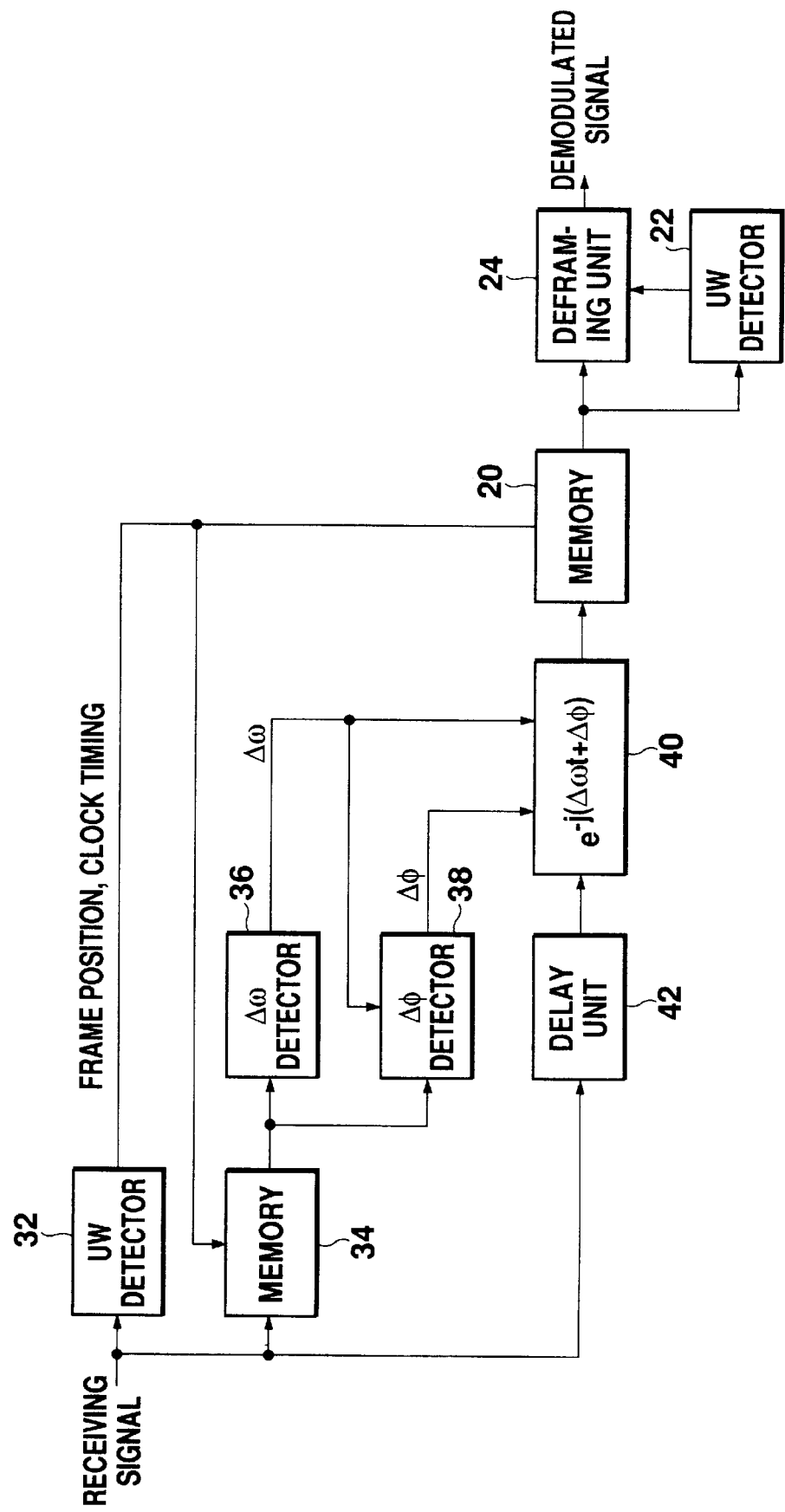
FIG. 1 is a block diagram showing the structure of a data demodulator according to one embodiment of the present invention.

Preferred embodiments of the present invention will next be described based on the accompanying drawings. The same members as those in the prior art may be hereinafter given the same reference numerals. Such members given the same reference numerals may have the same interior structure as those in the prior art, but their usage or functions are not necessarily the same. In the following, block diagrams are often referred to. This does not mean that the present invention is feasible only by means of hardware, as it is fairly practicable using software without problems.

FIG. 1 illustrates the structure of a data demodulator according to one preferred embodiment of the present invention. A UW detector 32 detects a timing when inputting of a UW section 104 of a not-synchronized receiving signal is finished (an end timing), that is, a frame position. It also detects a reference time for a receiving signal, or a clock timing. Memory 34, comprising a shift register having the same length as that of a UW section 104, receives and latches a receiving signal in synchronization with an over-sampling clock, and stops the latching operation in synchonism with the timing detected by UW detector 32. With these, clock synchronization and frame synchronization have been established.

Figure 2:
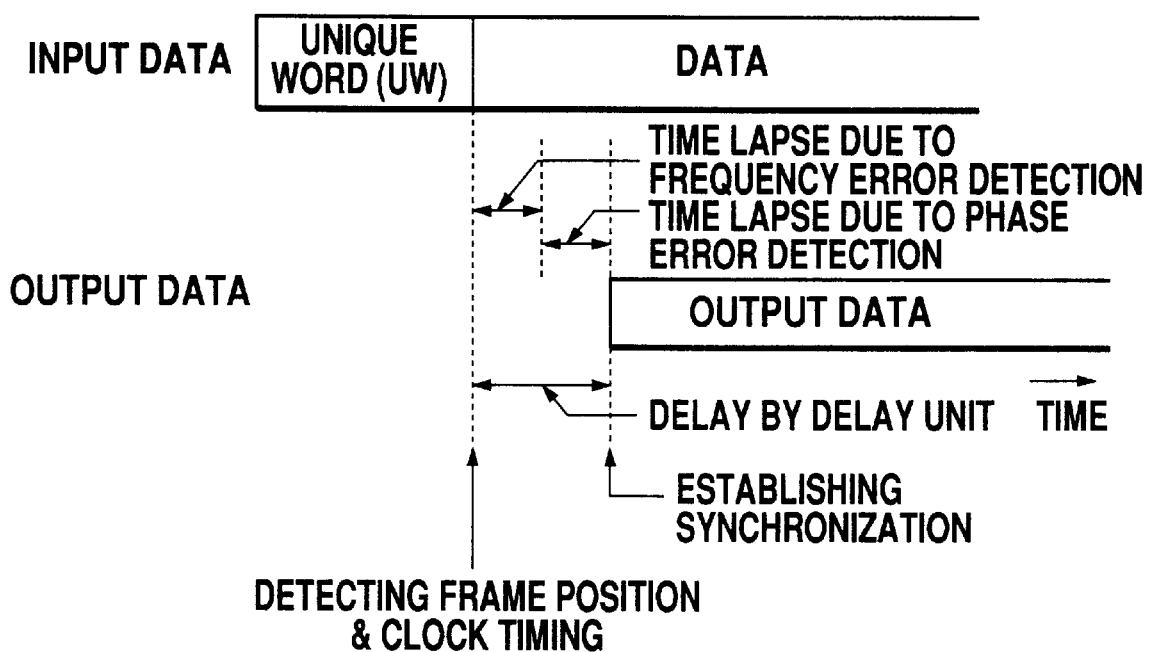
FIG. 2 is a timing chart showing a point where synchronization is established and a delayed time caused by a delay unit.

Subsequently, ω detector 36 and ΔΦ detector 38 detect a frequency error Δω and a phase error ΔΦ, respecively, utilizing a receiving signal held in memory 34, to be precise, in a UW section 104 therein. In the detection of a phase error ΔΦ, ΔΦ detector 38 utilizes a frequency error Δω which has been detected by Δω detector 36. Δω detector 36 and ΔΦ detector 38 then supply their detected errors into a complex rotator 40. Complex rotator 40, receiving also a signal from a delay unit 42, in turn multiplies the receiving signal by a phase rotation component $e^{-j(\Delta\omega t + \Delta\Phi)}$ which corresponds to the frequency error Δω and phase error ΔΦ supplied, whereby data in the receiving signal is demodulated. In this way, frequency synchronization and phase synchronization have been established by Δω detector 36, ΔΦ detector 38, and complex rotator 40. In the above process, a delay unit 42 supplies a receiving signal into complex rotator 40 in a delay corresponding to the delay occurred in the processes by Δω detector 36 and ΔΦ detector 38, as shown in FIG. 2.

Figure 15:
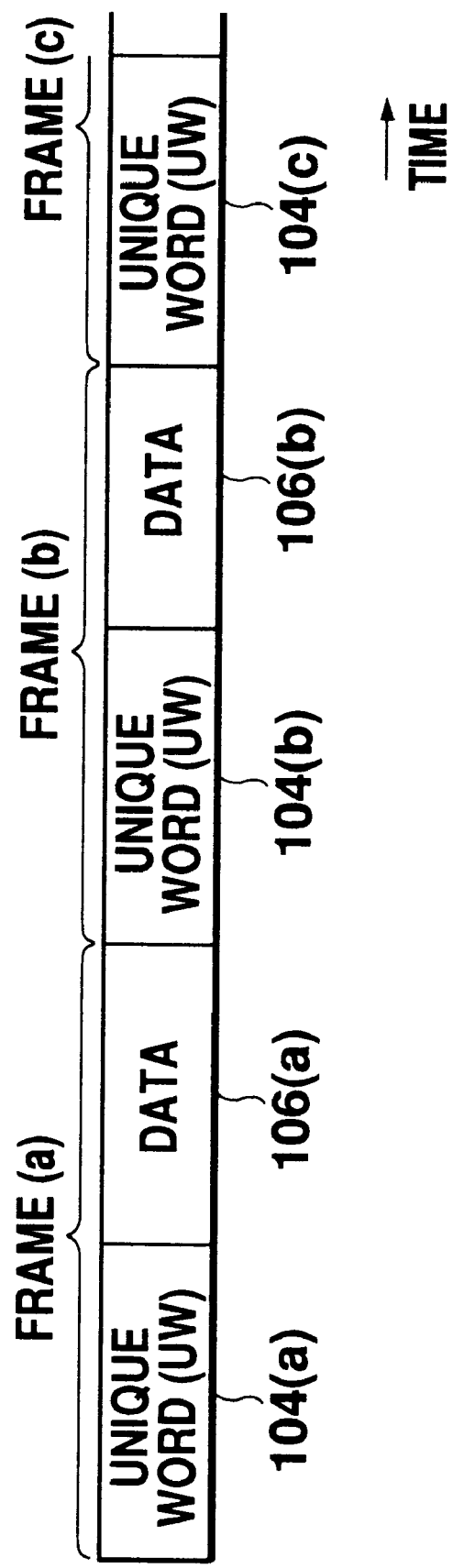
FIG. 15 is a block diagram showing a frame structure including no preamble.
Figure 16:
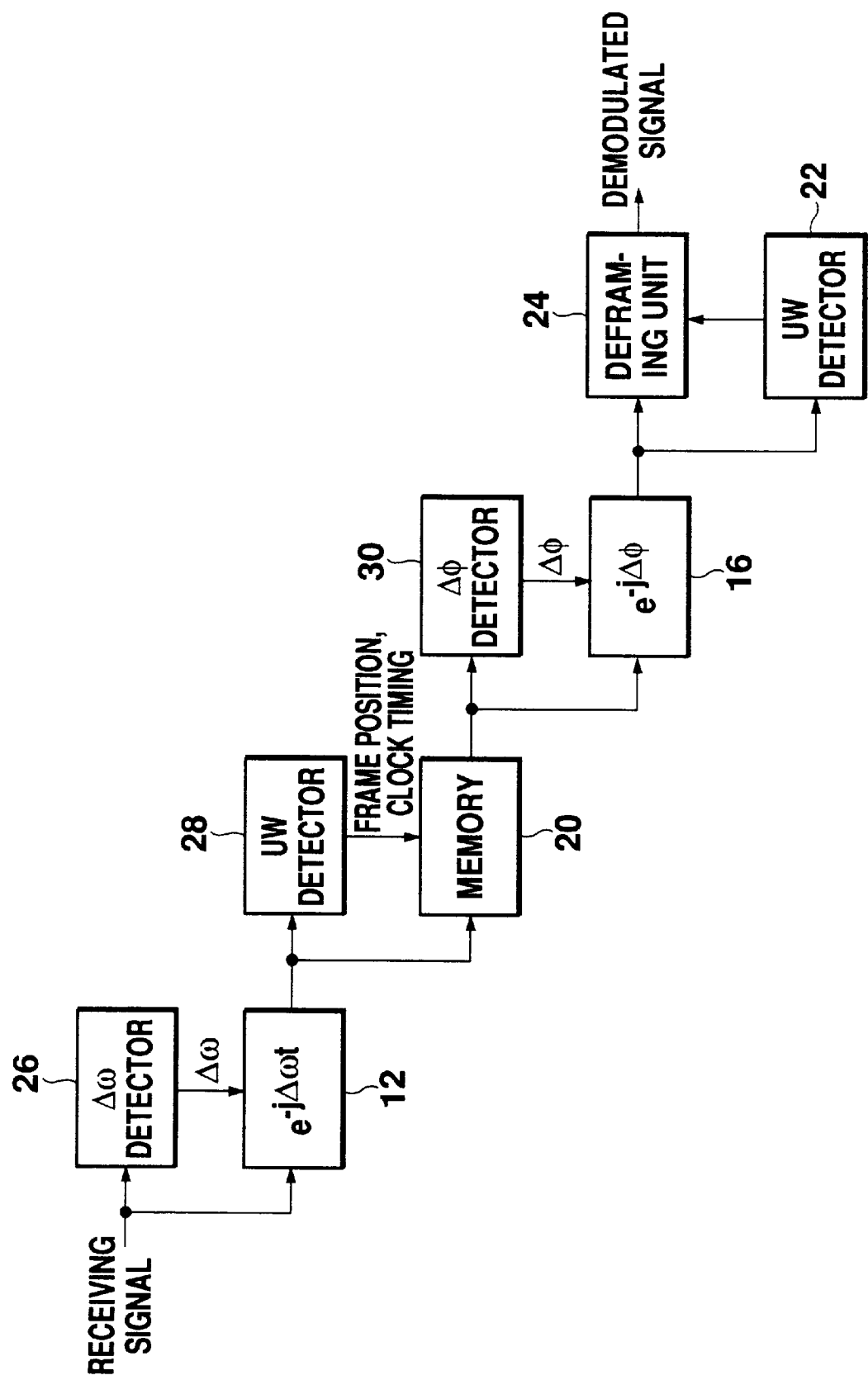
FIG. 16 is a block diagram showing the structure of a data demodulator according to a second prior art.
Figure 17:
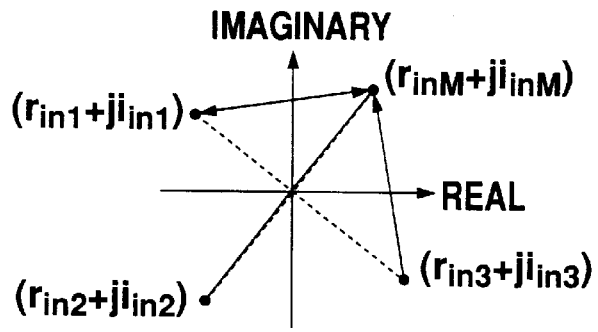
FIG. 17 is a phase plane view showing the principle of generating a continuous wave according to the prior art shown in FIG. 16.
Figure 18:
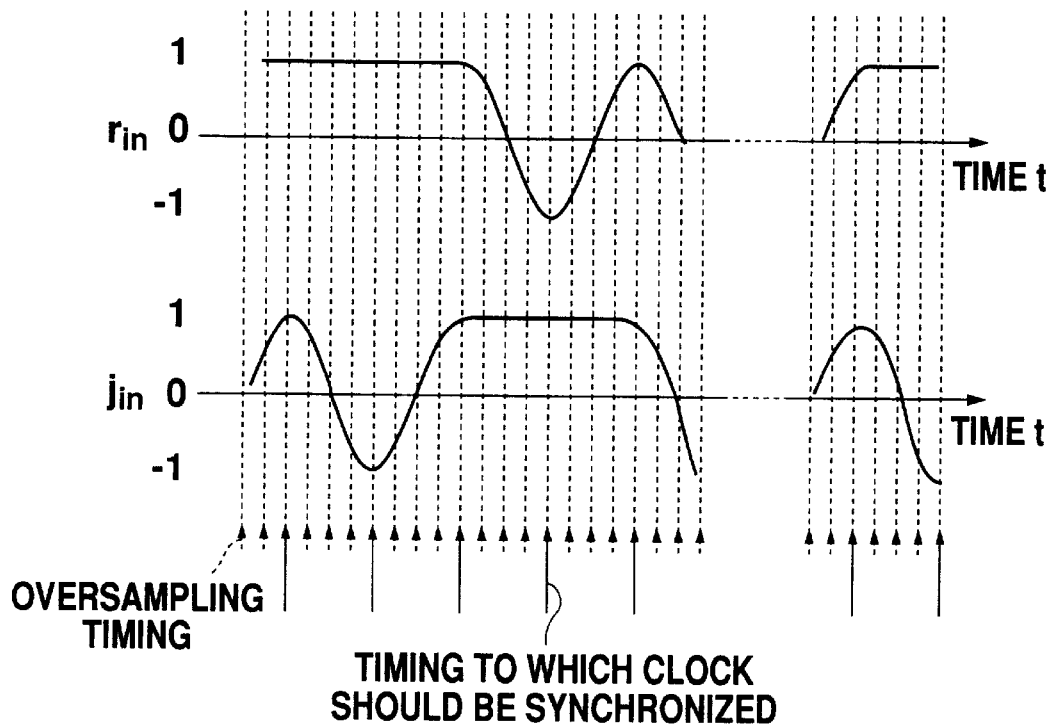
FIG. 18 is a timing chart showing the principle of establishing clock and frame synchronization according to the prior art shown n FIG. 16.
Figure 19:
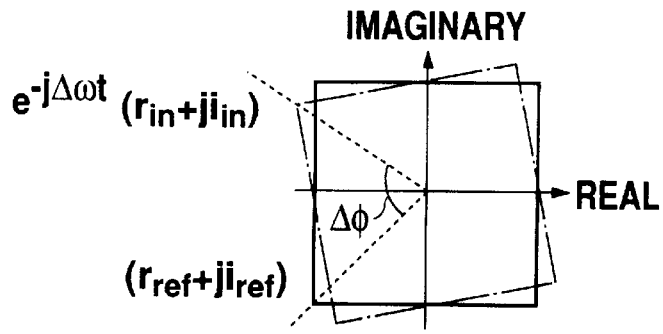
FIG. 19 is a phase plane view showing the principle of establishing phase synchronization according to the prior art shown in FIG. 16.
Figure 20:
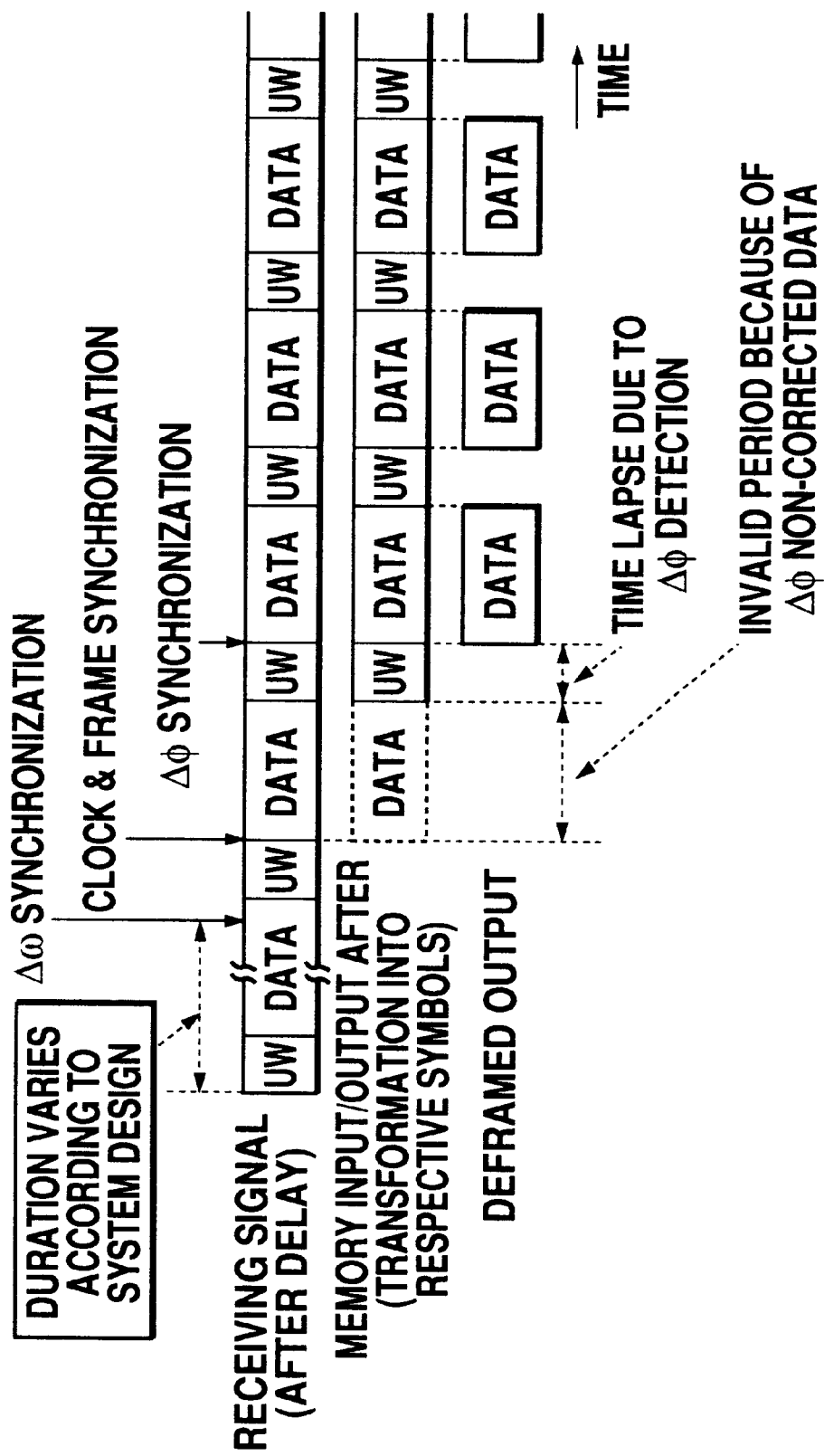
FIG. 20 is a timing chart showing a timing for establishing synchronization and demodulating data according to the prior art shown in FIG. 16.

A first characteristic feature of the preferred embodiment lies in the fact that clock and frame synchronization has been established prior to the establishment of frequency and phase synchronization. To be specific, clock and phase synchronization is established in such an operation that memory 34 sequentially latches a receiving signal in synchronization with an over-sampling clock, and stops the latching upon arrival of a detected frame position. By stopping the latching operation as above, information regarding a clock timing and a fame position becomes available. This process does not require either a UW or a BTR. Thus, even through a preamble is missing (see FIG. 15), clock and frame synchronization can be established using an UW section 104 (a) in the first frame (a), as shown in FIG. 2. Further, since memory 34 receives and latches an UW which has been transmitted in the UW section 104 of a receiving signal, frequency and phase synchronization can be established in a method applicable for high speed performance, such as complex conjugate multiplication or phase comparison between the UW held in memory 34 and reference data (described later).

A second characteristic feature of the preferred embodiment lies in the fact frequency synchronization and phase synchronization are established substantially concurrently (i.e., without waiting for the arrival of the next UW section 104) by repeatedly using an UW latched in memory 34 in a short time. In other words, more than one processing operation can be performed using a UW in parallel when the UW is held in memory 34, as a result of which the period of time necessary for establishing required synchronization can be reduced. Further, using the UW held in memory 34, frequency and phase synchronization can be established in a complicated symbol concurrent operation, such as a complex conjugate multiplication and phase comparison, and this also contributes to the reduction of a period of time necessary to complete the processing. Still further, since reference data to be used in complex conjugate multiplication and phase comparison is partially the same as the reference data to be used in the correlation detection by UW detector 32, reference data can be commonly used in all of those operations.

A third characteristic feature of the preferred embodiment lies in the fact that provision of a delay unit 42 enables uninterrupted data demodulation, in spite of a delay occurring in the process by Δω detector 36 and ΔΦ detector 38. That is, since data can be demodulated without missing data from the very beginning of data section 106 (a) of the initial frame (a) in FIG. 15, demodulated data of higher quality as compared to the existing art, is available to users. This is particularly advantageous in signal transmissions, such as a facsimile transmission, in which missing data seriously damages transmission quality. In addition, since a process delay deemed to be caused by Δω detector 36 and ΔΦ detector 38 is suppressed due to parallel execution of the processes for establishing frequency system and phase synchronization, which includes concurrent execution of complicated symbol operations, the delay in which delay unit 42 supplies a signal to its subsequent stage can be reduced, resulting in a shorter delay in the entire process shown in FIG. 1. This leads to improved real time performance, ensuring the usability of this device when high real time performance is required in, for instance, an audio frame transmission.

A fourth characteristics feature of the preferred embodiment lies in the fact that it is applicable to data transmission using frames which are originally designed with no preamble at the stage of designing or rendering into practice. The art shown in FIGS. 16 to 20, is designed basically to cope with a situation in which a preamble is missed due to an accident. This embodiment, on the other hand, aims to handle a frame which is originally so designed as not include a preamble, and the preparation process by a transmitter is thus simplified. This embodiment is obviously also applicable to a case of a missing preamble.

A fifth characteristic feature of the preferred embodiment lies in the fact that UW detector 32 performs delay detection with respect to a receiving signal as described later. With this, a frame position and a clock timing can be correctly and stably detected.

Figure 3:
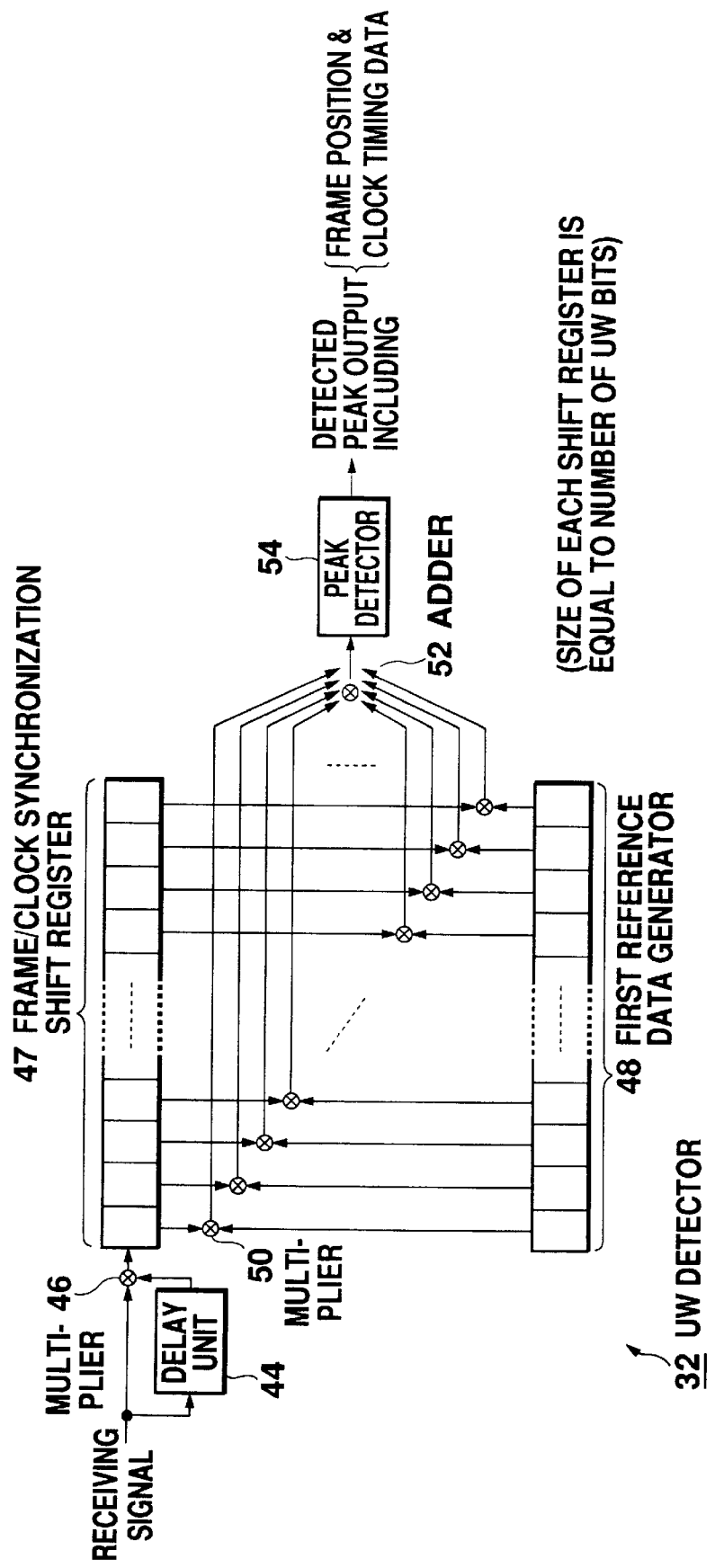
FIG. 3 is a block diagram showing the structure of a UW detector according to this embodiment.

In the following, respective members shown in FIG. 1 will be described in detail. Referring to FIG. 3, UW detector 32 comprises a delay detection circuit including a delay unit 44 and a multiplier 46. Delay unit 44 delays signal reception by an extent equivalent to a given number of symbols, and the multiplier 46 multiplies the delayed receiving signal by a receiving signal without a delay to thereby perform delay detection with respect to the receiving signal supplied. A frame/clock synchronization shift register 47, provided downstream the delay detection circuit, first over-samples the delay-detected receiving signal in accordance with an over-sampling clock which is n times (n is a natural number of two or more) as fast as a known and predetermined symbol rate (a reciprocal number of one symbol length in a receiving signal), and then latches it, so that it sequentially shifts the signals therein in synchronization with the over-sampling clock.

Figure 4:
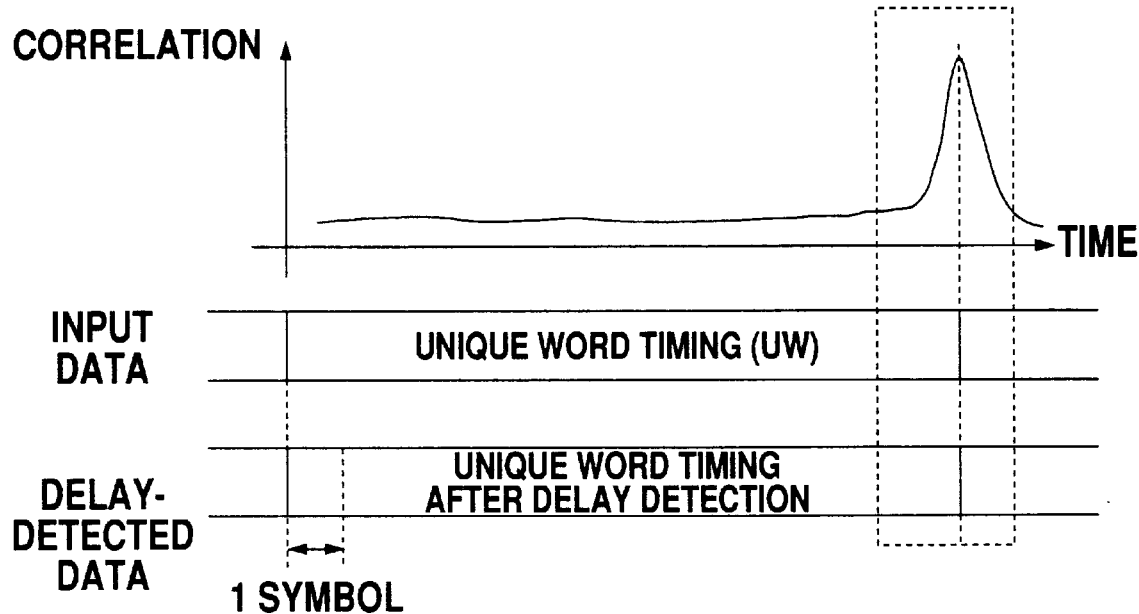
FIG. 4 is a timing chart showing the operation of a UW detector according to this embodiment.
Figure 5:
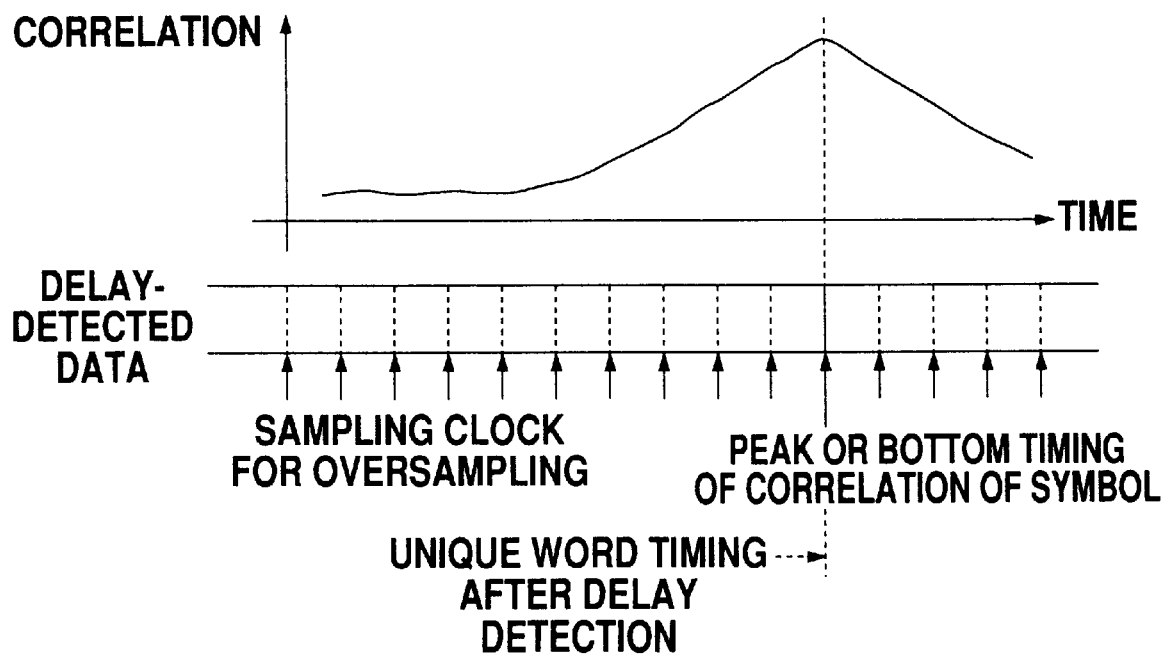
FIG. 5 is an enlarged timing chart for the part enclosed by a broken line in FIG. 4.

On the other hand, a first reference data generator 48 outputs a symbol series having the same length and value as those of a UW (to be strict, a UW value obtained in the delay detection), i.e., first reference data. Multipliers 50 multiply respective symbols held in shift register 47 by corresponding first reference data, so that an adder 52 sums up the multiplied results obtained by the multipliers 50. A peak detector 54 then detects a peak appearing in the sum, and outputs a signal indicating that timing. The sum obtained by the adder 52 represents the correlation between a symbol array outputted from shift register 47 and first reference data outputted from first reference data generator 48. A peak appears in the sum when the symbol array is identical to a UW (to be strict, a UW value obtained in the delay detection) (see FIGS. 4 and 5). Thus, by detecting a peak, it is possible to detect the timing at which UW section 104 input is completed, i.e., a frame position. The detected frame position is also synchronous to a clock used on the transmitter side. Thus, by halting a supplying operation of a receiving signal into memory 34 upon detection of a frame position, a UW can be held in memory such that frame synchronization and clock synchronization can be concurrently established.

Figure 6:
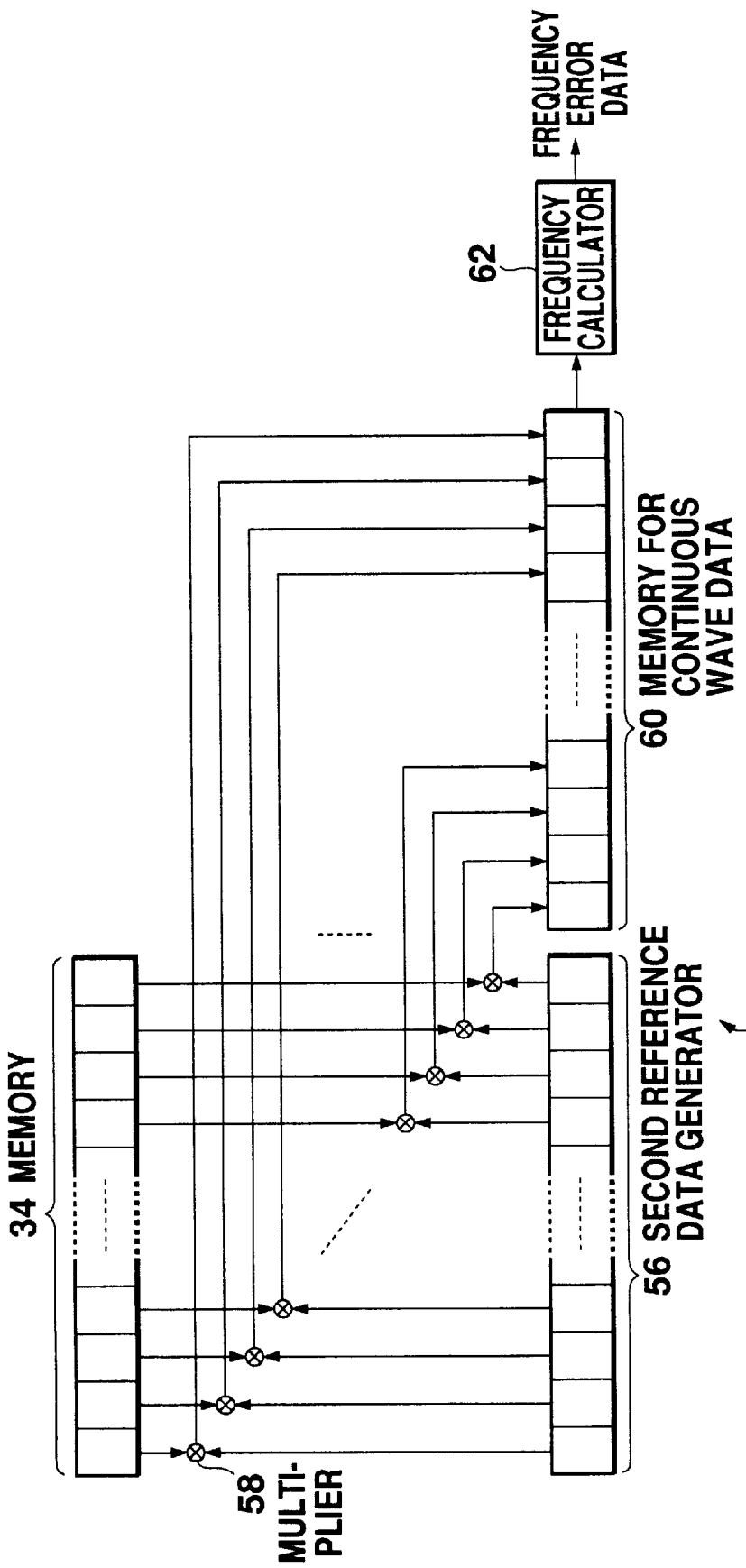
FIG. 6 is a block diagram showing the structure of a $\Delta\omega$ detector according to this embodiment.

FIG. 6 shows the structure of $\Delta\omega$ detector 36, which comprises a second reference data generator 56. Second reference data is a complex conjugate to and having the same length as a UW. Multipliers 58 multiply each of the respective symbols constituting second reference data by a corresponding symbol held in memory 34. Provided that each of the symbols in a UW is expressed as (r+ji) and a corresponding symbol to second reference data is thus as (r−ji), a product of the two symbols is expressed as $(r^2-i^2)$. Considering a frequency error $\Delta\omega$ and a phase error $\Delta\Phi$ which are generally found in an UW latched in memory 34, an output from each of multipliers 58 is expressed as $e^{j(\Delta\omega t+\Delta\Phi)} (r^2-i^2)$. When data has been modulated using a system which does not accompany an amplitude modulation component, a set of the outputted signals from multipliers 58 forms a circle having a radius of $r^2-i^2$ having its origin as a center, in the same manner as continuous waves. The thus obtained continuous wave is stored in a continuous wave data memory 60, and further supplied to a frequency calculator 62. Frequency calculator 62 detects the speed of phase rotation appearing in the continuous wave having m number of symbols to thereby detect a frequency error $\Delta\omega$.

Figure 7:
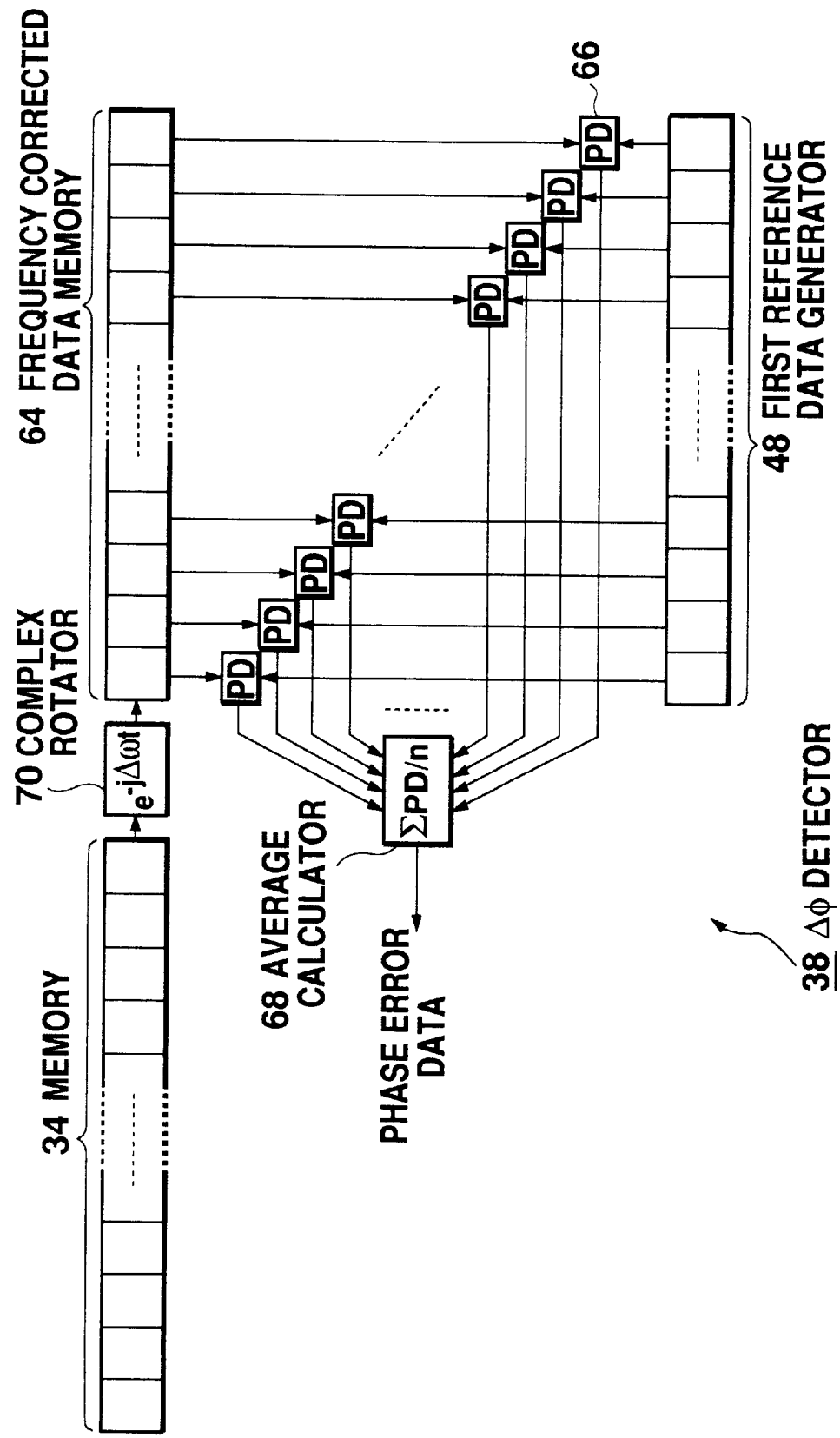
FIG. 7 is a block diagram showing the structure of a $\Delta\Phi$ detector according to this embodiment.
Figure 8:
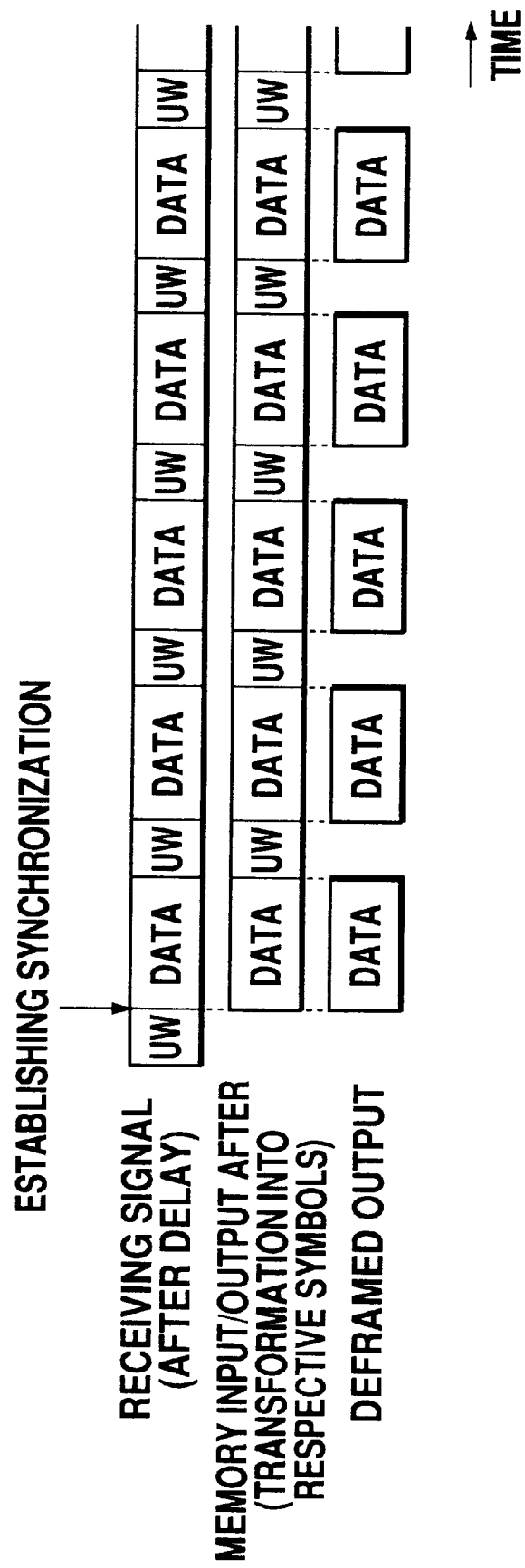
FIG. 8 is a timing chart showing a timing for establishing synchronization and demodulating data according to this embodiment.
Figure 9:
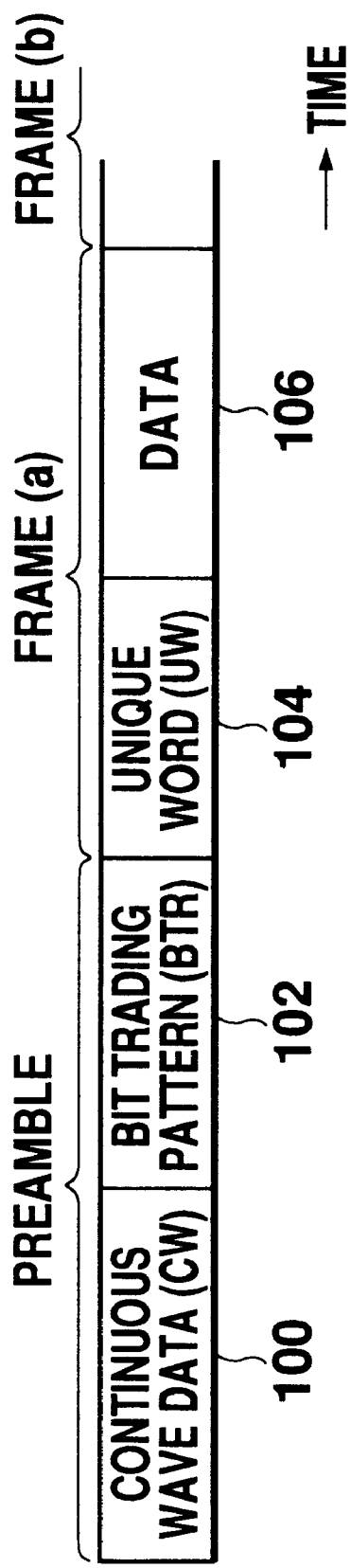
FIG. 9 is a block diagram showing an example of a general frame structure.
Figure 10:
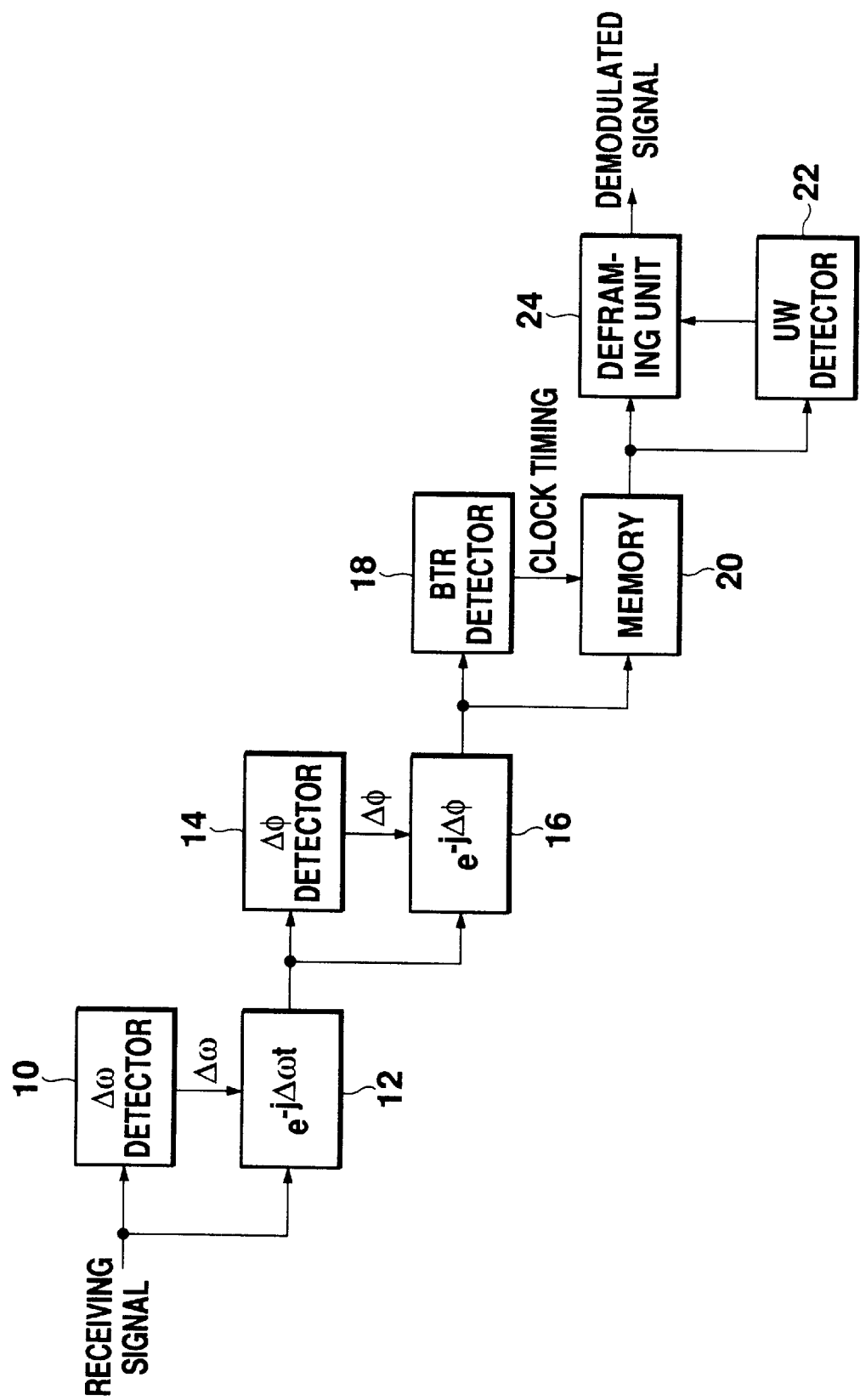
FIG. 10 is a block diagram showing the structure of a data demodulator according to a first prior art.
Figure 11:
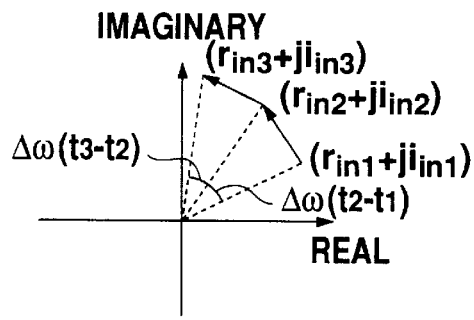
FIG. 11 is a phase plane view explaining the principle of establishing frequency synchronization according to the prior art shown in FIG. 10.
Figure 12:
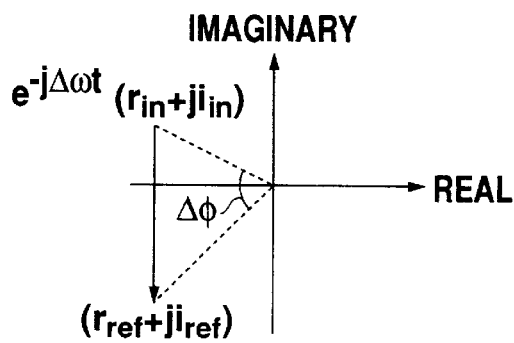
FIG. 12 is a phase plane view explaining the principle of establishing phase synchronization according to the prior art shown in FIG. 10.
Figure 13:
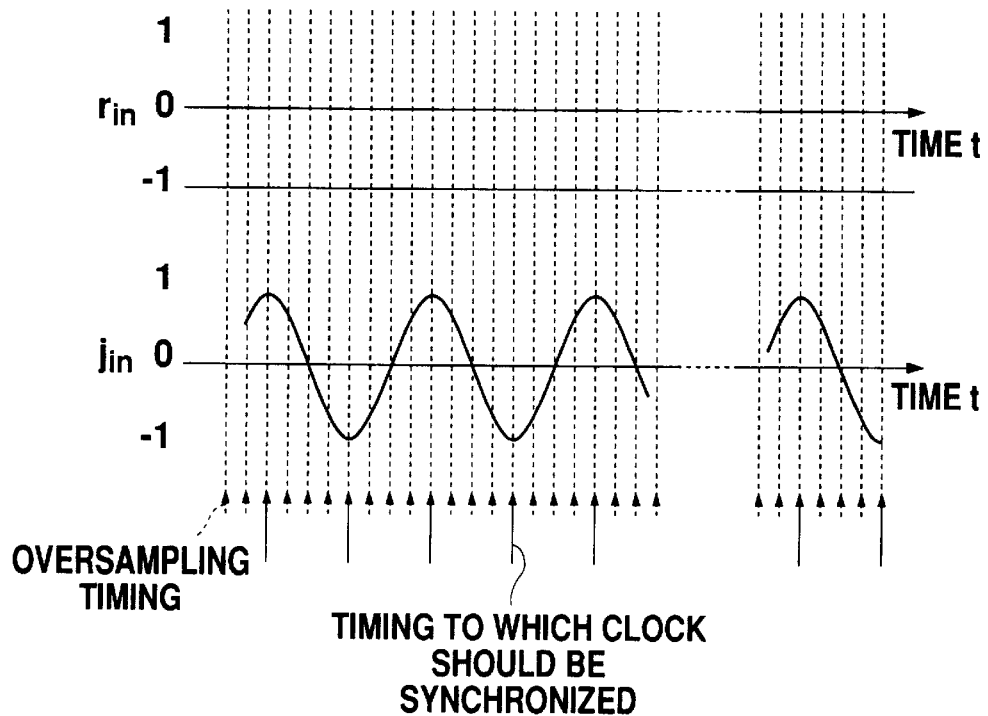
FIG. 13 is a timing chart explaining the principle of establishing clock and frame synchronization according to the prior art shown in FIG. 10.
Figure 14:
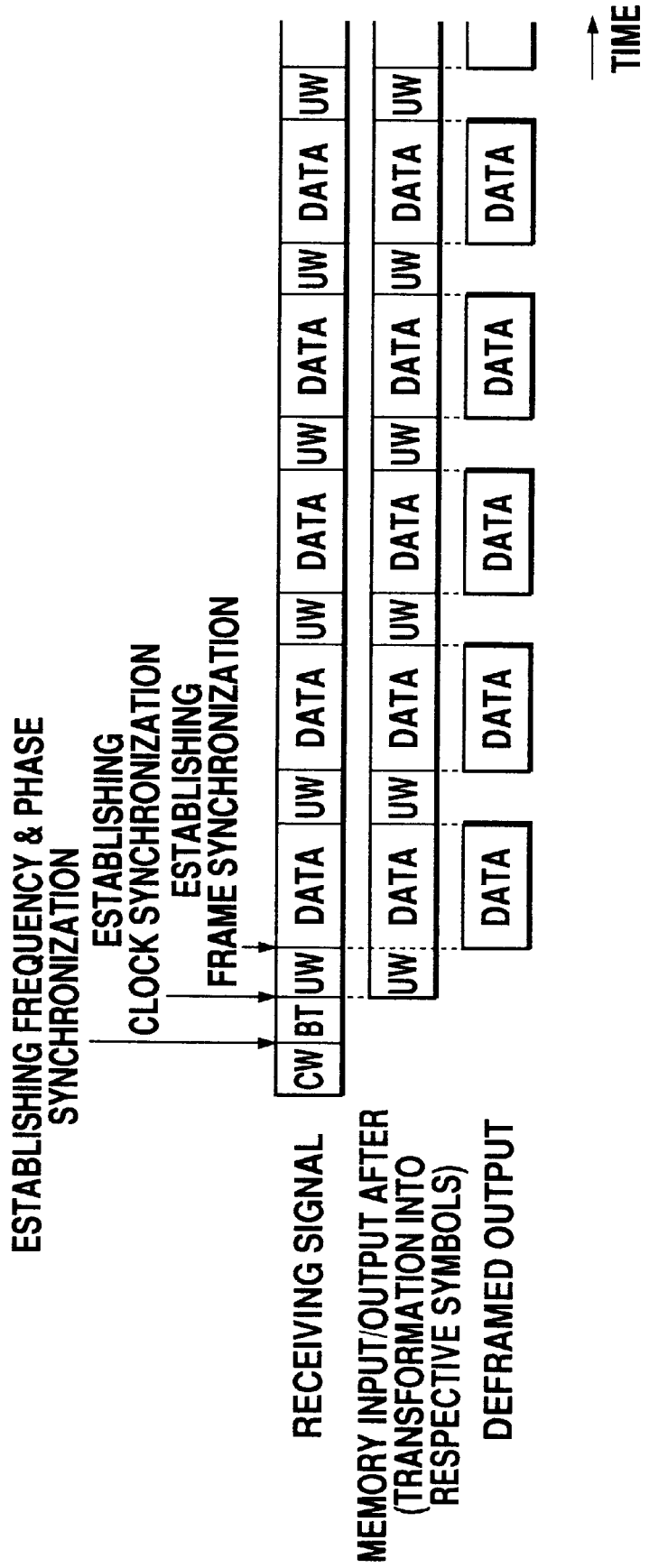
FIG. 14 is a timing chart showing a timing for establishing synchronization and demodulating data according to the prior art shown in FIG. 10.

FIG. 7 shows the structure of $\Delta\Phi$ detector 38. Complex rotator 70 multiplies a UW held in memory 34 by a phase rotation component $e^{-j\Delta\omega t}$ which corresponds to the frequency error $\Delta\omega$ detected by $\Delta\omega$ detector 36 to thereby compensate the frequency error $\Delta\omega$. A frequency-corrected data memory 64 is a shift register having the same length as a UW, for storing data whose phase is to be compared with that of first reference data by phase detector (PD) 66. Since those data held in frequency-corrected data memory 64 correspond to a UW, a phase difference obtained in the above phase comparison by PDs 66 is equal to a phase error $\Delta\Phi$. In order to suppress the variation due to noises in a detected result, an average calculator 68 calculates an average value of phase errors $\Delta\Phi$ provided by all PDs 66, and outputs the average value as a detected phase error $\Delta\Phi$ value. The thus obtained phase error $\Delta\Phi$ is supplied to complex rotator 40, to which frequency error $\Delta\omega$ has also been supplied by $\Delta\omega$ detector 36. Using the phase error $\Delta\Phi$ and a frequency error $\Delta\omega$ supplied, complex rotator 40 concurrently establishes frequency synchronization and phase synchronization. On the other hand, a delay occurred in the process by $\Delta\omega$ detector 36 and $\Delta\Phi$ detector 38 is compensated by a delay unit 42. With the above, no data will be missed. As described above, data can be demodulated from a receiving signal which includes no preamble while preventing missing of its initial frame (see FIG. 8).

Although a delay detection circuit is mentioned in the above description, referring to FIG. 3, the present invention is applicable to a receiver in which the delay detection is not carried out and to a modulation system other than a PSK which often go with the delay detection in a receiver. For the principle and modification of delay detection, refer to the related art documentation. Delay detection can offset a frequency error in a receiving UW. This is the reason why UW detector 32 employs delay detection here, and employment of delay detection by UW detection 32 is preferable when the present invention is applied to a transmission channel causing, for instance, a significant frequency shift.

Alternatively, a bottom detector may be used in the place of a peak detector 54 to detect a bottom, instead of a peak, appearing in a sum. An average calculator 68 is omissible when detection variation is considered small. Extent of a delay caused by the process by $\Delta\omega$ detector 36 and $\Delta\Phi$ detector 38 can be known from design information regarding these detectors and empirical information. Although means for generating over-sampling or other clocks is not shown in the accompanying drawings, this structure and generation method are well known to persons skilled in the art.

What is claimed is:

1. A method for establishing frame, clock, frequency and phase synchronization comprising:

receiving a framed data as an unsynchronized receiving signal;

simultaneously establishing clock synchronization and frame synchronization of a receiver side relative to a transmitter side, by sampling and latching the unsynchronized receiving signal in accordance with a clock timing and a frame position, both the clock timing and the frame position being detected from the unsynchronized receiving signal, to generate a clock-and-frame synchronized receiving signal, wherein the clock timing is a timing of a clock used in preparation of a frame on the transmitter side, and the frame position is a position of data in the frame;

detecting a frequency error of a carrier, the carrier used for transmitting the framed data from the clock-and-frame synchronized receiving signal;

detecting a phase error of the carrier from the clock-and-frame synchronized receiving signal, while utilizing the detected frequency error to cancel a phase rotation due to the frequency error from the clock-and-frame synchronized receiving signal;

generating a delay-compensated receiving signal by delaying the unsynchronized receiving signal according to a period of time necessary to complete the frequency error detection and phase error detection steps; and simultaneously establishing frequency synchronization and phase synchronization of the receiver side relative to the transmitter side, by compensating a phase rotation and phase shift in the delay-compensated receiving signal, on the basis of the frequency error and the phase error detected in the frequency error detection and phase error detection steps.

2. A method of claim 1, wherein:

first and second reference data having a same length as a unique word to be contained in the frame are prepared prior to execution of the clock synchronization, frame synchronization, frequency error detection and phase error detection steps, the first data being identical to the unique word, the second data being a complex conjugate of the first data; and the timing detection, the frequency error detection, and the phase error detection steps are carried out respectively by detecting a timing when a correlation between the unsynchronized receiving signal and the first reference data reaches a maximum, by detecting a phase rotation speed based on a multiplied result of the clock-and-frame synchronized receiving signal and the second reference data, and by comparing phases of a receiving signal having a compensated frequency error and the first reference data.

3. A method of claim 1, wherein:

the unsynchronized receiving signal is subjected to delay detection prior to execution of the clock and frame synchronization.

4. A data demodulator comprising:

first synchronizing means for, when receiving a framed data as an unsynchronized receiving signal, simultaneously establishing clock synchronization and frame synchronization of a receiver side relative to a transmitter side, by sampling and latching the unsynchronized receiving signal in accordance with a clock timing and a frame position, the clock timing and frame position both detected from the unsynchronized receiving signal so as to generate a clock-and-frame synchronized receiving signal, the clock timing being a timing of a clock used in preparation of a frame on the transmitter side, the frame position being a position of data in the frame;

frequency error detection means for detecting a frequency error of a carrier from the clock-and-frame synchronized receiving signal;

phase error detection means for detecting a phase error of the carrier from the clock-and-frame synchronized receiving signal, while utilizing the frequency error detected by the frequency error detection means to cancel a phase rotation due to the frequency error from clock-and-frame synchronized receiving signal;

delay means from generating a delay-compensated receiving signal by delaying the unsynchronized receiving signal according to a period of time necessary to complete the operation of the frequency error detection means and the phase error detection means; and second synchronizing means for simultaneously establishing frequency synchronization and phase synchronization of the receiver side relative to the transmitter side, by compensating a phase rotation and phase shift in the delay-compensated receiving signal, on the basis of the frequency error and the phase error detected in the frequency error detection means and the phase error detection means.

* * * * *